(12) United States Patent
Vaissiere (10) Patent No.: US 9,846,072 B2
(45) Date of Patent: Dec. 19, 2017

(54) METHOD OF IN LINE VERIFICATION OF A FLOW METER

(71) Applicant: Endress + Hauser Messtechnik GmbH + Co. KG, Weil am Rhein (DE)

(72) Inventor: Dimitri Vaissiere, Wittersdorf (DE)

(73) Assignee: Endress + Hauser Consult AG, Reinach (CH)

(*) Notice: Subject to any disclaimer, the term of this patent is extended or adjusted under 35 U.S.C. 154(b) by 555 days.

(21) Appl. No.: 14/365,740

(22) PCT Filed: Dec. 7, 2012

(86) PCT No.: PCT/EP2012/074744
§ 371 (c)(1),
(2) Date: Jun. 16, 2014

(87) PCT Pub. No.: WO2013/092245
PCT Pub. Date: Jun. 27, 2013

(65) Prior Publication Data
US 2014/0352399 A1     Dec. 4, 2014

(30) Foreign Application Priority Data
Dec. 19, 2011 (EP) .................................... 11194382

(51) Int. Cl.
    *G01F 25/00*     (2006.01)
    *G01F 1/66*     (2006.01)

(52) U.S. Cl.
    CPC ............... *G01F 25/00* (2013.01); *G01F 1/66* (2013.01); *G01F 1/662* (2013.01); *G01F 1/667* (2013.01);
(Continued)

(58) Field of Classification Search
CPC ........................ G01F 25/00; G01F 25/0007
See application file for complete search history.

(56) References Cited

U.S. PATENT DOCUMENTS 6,381,549 B1 * 4/2002 Smith .............................. 702/54
7,643,947 B2 * 1/2010 Baumoel ......................... 702/45
(Continued)

FOREIGN PATENT DOCUMENTS

| CN | 1405535 A | 3/2003 |
|---|---|---|
| CN | 101339068 A | 1/2009 |
| GB | 2318414 A | 4/1998 |

OTHER PUBLICATIONS

Bernt Svensson, "Application of Ultrasonic Clamp-on Flow Meters for in situ Tests of Billing Meters in District Heating Systems", Flow Measurement and Instrumentation Elsevier UK, vol. 9, No. 1, Mar. 1998, pp. 33-41.
(Continued)

*Primary Examiner* — Robert R Raevis
(74) *Attorney, Agent, or Firm* — Bacon & Thomas, PLLC (57) ABSTRACT

A method of in line verification of a flow meter installed in a flow line by means of one or two ultrasonic clamp on flow meters to be installed in line with the flow meter $u_\tilde{A}$, comprising a preparatory phase, during which a virtual pipe diameter is determined, which if it had been applied during the simultaneous measurements would have minimized the differences between the measured flow indications of the flow meter and the measured flow indications, and comprising a verification phase, during which the ultrasonic flow meters are set up to determine their measured flow indications based on the virtual pipe diameter, during which simultaneously derived measured flow indications of the flow meter and the ultrasonic flow meters are recorded, and during which an alert is issued in case a deviation between simultaneously derived measured flow indications of the flow meter and the ultrasonic flow meter or between measured flow indications of the flow meter and averages of the measured flow indications of the ultrasonic flow meters respectively exceeds a predetermined deviation limit, which (Continued)

was set based on a measurement uncertainty inherent to the determination of the deviation.

11 Claims, 3 Drawing Sheets

(52) U.S. Cl.
CPC ........ *G01F 25/003* (2013.01); *G01F 25/0007* (2013.01)

(56) References Cited

U.S. PATENT DOCUMENTS

| | | |
|---|---|---|
| 7,984,637 B2 | 7/2011 | Tilden |
| 2014/0069207 A1* | 3/2014 | Leaders et al. ............ 73/861.28 |

OTHER PUBLICATIONS

M. L. Sanderson, "Guidelines for the use of Ultrasonic Non-Invasive Metering Techniques", Flow Measurement and Instrumentation Elsevier UK, vol. 13, No. 4, Aug. 2002, pp. 125-142.
J. M. Szebeszczyk, "Application of Clamp-on Ultrasonic Flowmeter for Industrial Flow Measurements", Flow Measurement and Instrumentation UK, vol. 5, No. 2, Apr. 1994, pp. 127-131.
EPO Search Report, EPO, Munich, Germany, dated May 31, 2012.
International Search Report, EPO, The Netherlands, dated Mar. 27, 2013.
Ren Xiaoyan, Hua Bo, "Discussion on the on-line Calibration Method of Liquid Flowmeters", Journal of Henan Institute of Science and Technology, Dec. 2009.

* cited by examiner

METHOD OF IN LINE VERIFICATION OF A FLOW METER

TECHNICAL FIELD

The present invention relates to a method of in line verification of a flow meter by determining a deviation between measured flow indications of the flow meter to be verified and measured flow indications of one or two ultrasonic clamp on flow meters, installed in line with the flow meter to be verified.

BACKGROUND DISCUSSION

Flow meters are commonly used devices for measuring a flow of a medium through a pipe. In various branches of industry, for example in the chemical industry or in the pharmaceutical industry, measured flow indications obtained by flow meters are used to control complex industrial processes.

There is a wide variety of flow meters on the market, operating on various different measurement principles, like for example ultrasonic flow meters, coriolis flow meters, vortex flow meters or electromagnetic flow meters.

In order to ensure, that flow meters fulfill a specified measurement accuracy, they are calibrated before they are first installed. Calibration is a process during which measurement indications obtained with the flow meter to be calibrated under predefined conditions are compared to a corresponding reference or standard. To this extend the accuracy with which the corresponding reference or standard needs to be known or determined has to be at least as accurate, preferably more accurate, than the measurement accuracy specified for the flow meter under test. Flow meter calibrations are thus regularly performed on specially designed calibration rigs, capable of producing an accurately determinable flow through the flow meter under test and/or capable of sending an accurately determinable quantity of a medium through the flow meter under test.

In case calibration shows that the measured flow indications of the flow meter under test are less accurate than specified, the flow meter is adjusted based on the calibration data, and re-calibration is performed, until the achieved measurement accuracy complies to the specified measurement accuracy. Compliance is for example determined by comparing the largest measurement indication error, determined during calibration, to a maximal permissible error. The maximal permissible error is the largest measurement indication error, that a flow meter may have, whilst still in compliance the specified measurement accuracy.

The flow meter is then installed on a measurement site and taken into operation. During the life time of a flow meter its measurement properties may change due to aging, environmental conditions, or other effects.

Thus in order to ensure the specified measurement accuracy during long term operation of the flow meter, flow meters are re-calibrated regularly, e.g. once a year. Since re-calibration generally requires the use of specially designed calibration rigs, re-calibration cannot be performed in line during normal operation of the flow meter at the measurement site. Thus re-calibration is time and cost intensive, since it usually requires an interruption of the ongoing production process at the measurement site.

To avoid or at least reduce the time and cost involved in re-calibration, it is feasible to install an additional flow meter in line with the flow meter under consideration, and to verify proper operation of the flow meter based on a deviation between the measured flow indications of the two flow meters on site. In this respect non-invasive ultrasonic flow meters, comprising ultrasonic transducers to be clamped on the outside of the pipe, would be most suitable since they can be easily mounted on site on demand without any interruption of the ongoing production process on the site, and properly re-calibrated before every verification.

Under favorable conditions ultrasonic flow meters achieve a measurement accuracy of about 2% of the measured flow. Thus they render much less accurate measurement results than for example Vortex flow meters typically achieving a measurement accuracy in the range of 1%, electro-magnetic flow meters typically achieving a measurement accuracy in the range of 0.2%-0.5%, or Coriolis flow meters achieving a measurement accuracy in the range of 0.1%. The deviation between the measured flow indication $Q^{US}$ of the ultrasonic flow meter and the measured flow indication $Q^{FL}$ of the flow meter to be verified is determined as their difference $\Delta$ given by:

$$\Delta = Q^{FL} - Q^{US} \qquad (1)$$

Thus the standard measurement uncertainty of this deviation $\Delta$ is assessed according to the law of propagation of uncertainty described e.g. in the ISO Guide 98-3 of the international organization of standardization to be equal to:

$$u_\Delta = \sqrt{u_{FL}^2 + u_{US}^2} \qquad (2)$$

wherein $u_{FL}$ is a standard measurement uncertainty of the flow meter, and $u_{US}$ is a standard measurement uncertainty of the ultrasonic flow meter.

Thus for an ultrasonic flow meter with a measurement accuracy of 2% and a flow meter with a measurement accuracy of 0.5% the standard uncertainty of the deviation will amount to 1.03%, when considering a standard measurement uncertainty equal to half the measurement accuracy. Thus an expanded uncertainty corresponding to this assumption amounts to 2.03%. Therefore only deviations $\Delta$ between corresponding measurement indications of the two flow meters of more than 2.06% of the measured flow can be identified as being due to impaired measurement properties of the flow meter to be verified, with an acceptable level of confidence. Smaller deviations do not render information on the measurement properties of the flow meter to be verified, since they are within the measurement uncertainty of the verification method.

SUMMARY OF THE INVENTION

It is an object of the invention to provide a method of inline verification of flow meters by means of an ultrasonic clamp on flow meter, having a low uncertainty inherent to the method.

To this extend the invention comprises a method of in line verification of a flow meter comprising a preparatory phase and at least one verification phase, wherein the preparatory phase comprises the steps of:

calibrating the flow meter and installing it in a flow line at a measurement site, installing a calibrated ultrasonic clamp on flow meter in line to the flow meter on the same flow line, setting up the ultrasonic flow meter to generate measured flow indications based on a predetermined functional dependency of the indication on flow dependant quantities measured by the ultrasonic flow meter and predetermined values of parameters inherent to the measurement site, including a predetermined value of an inner diameter of the flow line, simultaneously measuring a flow through the flow line with the ultrasonic flow meter and with the flow meter and recording a predetermined number of their simultaneously derived measured flow indications, and determining a virtual pipe diameter based on the recorded measured flow indications and the functional dependency of the measured flow indications of the ultrasonic flow meter, which if it had been applied during the simultaneous measurements would have minimized the differences between corresponding measured flow indications of the flow meter and the ultrasonic flow meter, and wherein the verification phase comprises the steps of:

installing the ultrasonic flow meter in the same way as during the preparatory phase and setting it up to determine its measured flow indications based on the virtual pipe diameter, simultaneously measuring a flow through the flow line with the flow meter and the ultrasonic flow meter, determining a deviation between simultaneously derived measured flow indications of the flow meter and the ultrasonic flow meter, and issuing an alert in case the deviation exceeds a predetermined deviation limit, which was set based on a standard measurement uncertainty inherent to the determination of the deviation.

According to an embodiment of the invention, the deviation is a simple deviation given by a difference between a measured flow indication of the ultrasonic flow meter and a simultaneously derived measured flow indication of the flow meter to be verified.

According to a preferred embodiment the deviation is an average deviation given by an average of the differences between the simultaneously derived measured flow indications of the ultrasonic flow meter and the measured flow indications of the flow meter to be verified derived during a predetermined number of flow measurements performed during the verification phase.

According to a refinement of the method according to the invention the standard measurement uncertainty inherent to the determination of the deviation solely comprises a contribution of an uncertainty of the flow meter and a contribution of a repeatability of the measured flow indications of the ultrasonic flow meter.

The invention further comprises a second variation of the method of in line verification of a flow meter comprising a preparatory phase and at least one verification phase, wherein the preparatory phase comprises the steps of:

calibrating the flow meter and installing it in a flow line at a measurement site, installing two calibrated ultrasonic clamp on flow meters in line to the flow meter on the same flow line, setting up the ultrasonic flow meters to generate measured flow indications based on a predetermined functional dependency of the measured flow indication on flow dependant quantities measured by the ultrasonic flow meters and predetermined values of parameters inherent to the measurement site, including a predetermined value of an inner diameter of the flow line, simultaneously measuring a flow through the flow line with the ultrasonic flow meters and with the flow meter and recording a predetermined number of their simultaneously derived measured flow indications, and determining a virtual pipe diameter based on the recorded measured flow indications and the functional dependency of the measured flow indications of the ultrasonic flow meters, which if it had been applied during the simultaneous measurements would have minimized the differences between the averages of the simultaneously derived measured flow indications of the ultrasonic flow meters and the simultaneously derived measured flow indications of the flow meter, and wherein the verification phase comprises the steps of:

installing the ultrasonic flow meters in the same way as during the preparatory phase and setting each of them up to determine its measured flow indications based on the virtual pipe diameter, simultaneously measuring a flow through the flow line with the flow meter and the ultrasonic flow meters, determining a deviation between measured flow indications of the flow meter and the average of the simultaneously derived measured flow indications of the ultrasonic flow meters, and issuing an alert in case the deviation exceeds a predetermined deviation limit, which was set based on a standard measurement uncertainty inherent to the determination of the deviation.

According to an embodiment of the second variation of the method, the deviation is a simple deviation given by a difference between the average of the simultaneously derived measured flow indications of the ultrasonic flow meters and a simultaneously derived measured flow indication of the flow meter to be verified, According to a preferred embodiment of the variation of the second method, the deviation is an average deviation given by an average of differences between the averages of the simultaneously derived measured flow indications of the ultrasonic flow meters and a simultaneously derived measured flow indication of the flow meter to be verified, derived during of a predetermined number of flow measurements performed during the verification phase.

According to a refinement of the variation of the second method the measurement uncertainty inherent to the determination of the deviation solely comprises a contribution of an uncertainty of the flow meter and a contribution of a repeatability of the averages of the measured flow indications of the ultrasonic flow meters.

According to an embodiment of the two variant methods according to the invention, the flow of the medium sent through the flow line is a reproducible flow providing the same flow profile across an interior of the flow line during the preparatory phase and the verification phase.

According to a further embodiment of the two variant methods according to the invention, the verification phase is executed regularly, periodically or on demand.

According to a further embodiment of the two variant methods according to the invention, one or more verification phases are executed between consecutively executed re-calibrations of the flow meter, and time intervals between consecutive re-calibrations are determined based on the deviations determined during the verification phases.

BRIEF DESCRIPTION OF THE DRAWINGS

The invention and further advantages are explained in more detail using the figures of the drawing, in which one exemplary embodiment is shown. The same reference numerals refer to the same elements throughout the figures.

DETAILED DISCUSSION IN CONJUNCTION WITH THE DRAWINGS

Figure 1:
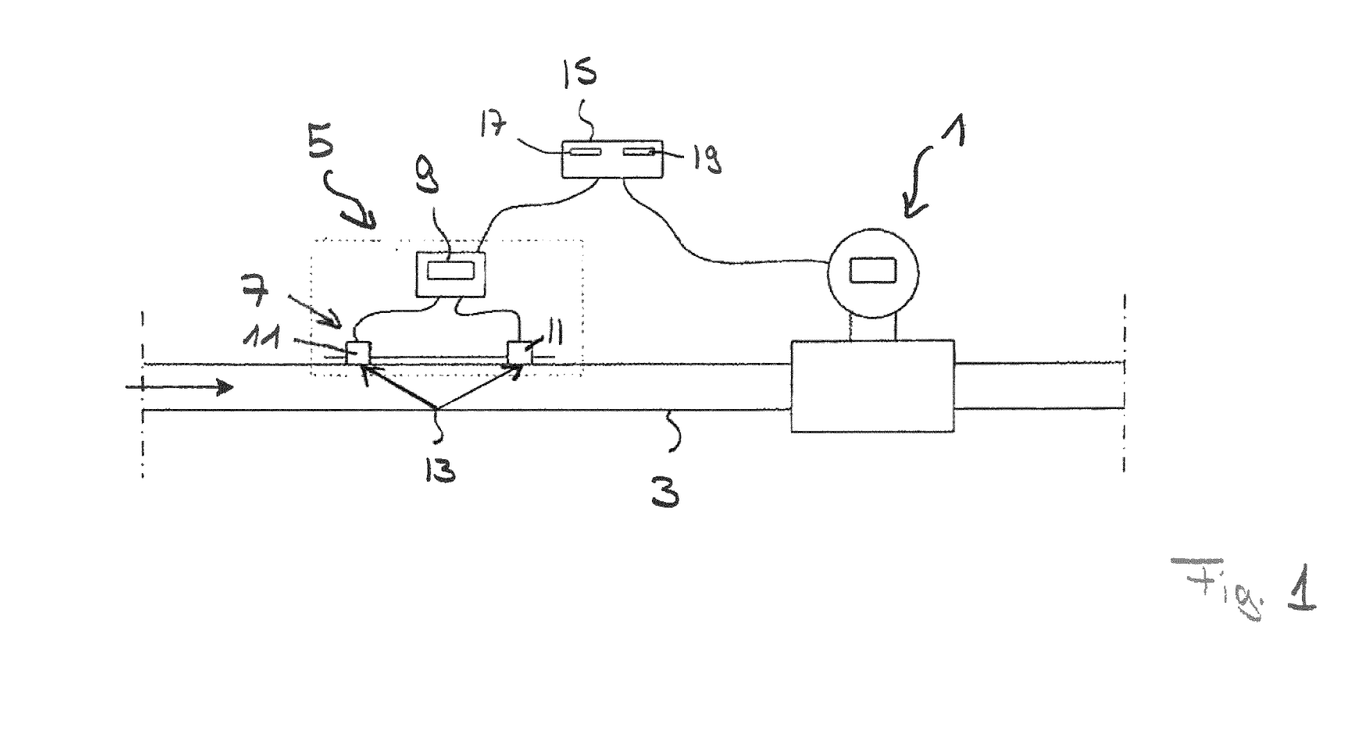
FIG. 1 shows: a measurement arrangement for executing an inline verification according to the invention.

FIG. 1 shows a measurement arrangement for inline verification of a flow meter 1 to be verified, comprising a flow line 3, the flow meter 1 to be verified, and an ultrasonic clamp on flow meter 5.

The flow meter 1 to be verified can be any type of flow meter, e.g. a coriolis flow meter, a vortex flow meter, an electro-magnetic flow meter, or an ultrasonic flow meter.

The flow line 3 is for example a single pipe, as shown in FIG. 1, or a system of pipes, lines or conduits, for transporting a flowing medium, interconnected such, that the same flow flows throughout the entire length of the flow line 3.

The ultrasonic clamp on flow meter 5 is for example a flow meter operating on the Doppler principle or operating on the travel time difference principle, comprising a measurement unit 7 for measuring flow dependent quantities and an electronic 9, for determining a measured flow indication Q, based on a functional dependency of the indication Q on the measured quantities, on parameters inherent to the ultrasonic flow meter 5, and on parameters inherent to the measurement site.

In case of the Doppler principle, ultrasonic signals of predetermined frequencies are transmitted through a pipe wall into the flowing medium, and their reflections are evaluated. According to the Doppler principle a flow velocity of the medium is determined based on a frequency shift occurring between the transmitted signals and their reflections. A product of a cross-sectional area of the flow line and the flow velocity thus provides a measure of the volumetric flow of the medium through the flow line.

Ultrasonic flow meters operating on the travel-time difference principle measure flow based on a difference of transit times of ultrasonic signals, for example pulses or beams, alternately transmitted on a single path along and against the flow.

Since ultrasonic flow meters operating on the Doppler principle can only be applied in applications wherein the medium contains air bubbles, contaminants or other elements, reflecting ultrasonic signals, the invention is described in detail based on an ultrasonic flow meter 5 operating on the travel time difference principle, as shown in FIG. 1. It can however be applied to ultrasonic flow meters operating on the Doppler principle accordingly.

Figure 2:
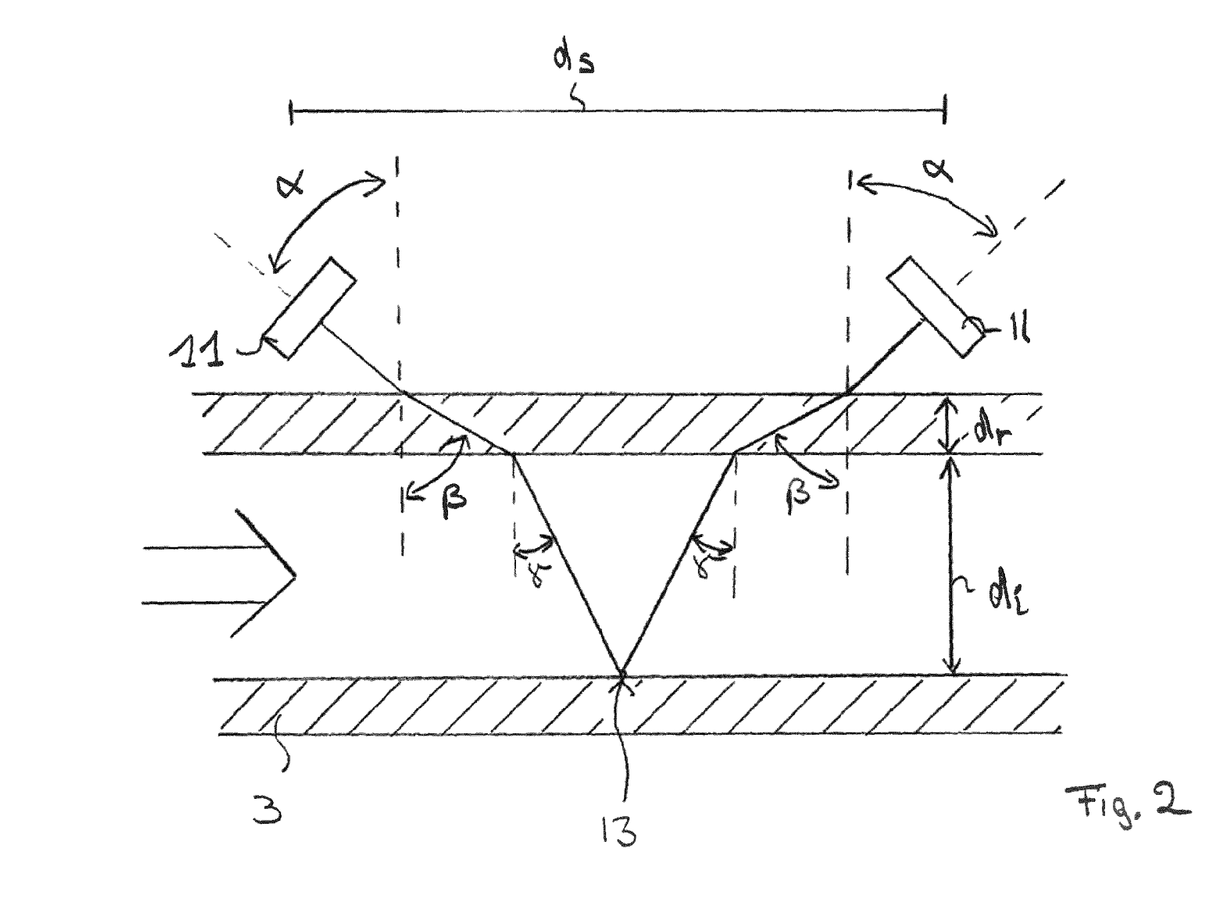
FIG. 2 shows: a measurement unit of the ultrasonic clamp on flow meter of FIG. 1.

FIG. 2 shows a cross-sectional view of the measurement unit 7 of the ultrasonic clamp on flow meter 5 operating on the travel time difference principle shown in FIG. 1. It comprises two ultrasonic transducers 11 which are mounted on an outside of the flow line 3, one upstream of the other. They are inclined towards each other by an angle $\alpha$ with respect to the flow line 3. Each transducer 11 alternately acts as a transmitter for sending ultrasonic signals and for receiving ultrasonic signals transmitted towards it by the respective other ultrasonic transducer 11. Each transducer 11 transmits its signals into the flow line 3 through a pipe wall section it is mounted onto. The signals are reflected at an opposing pipe wall 13 and travel through the interior of the flow line 3 and the pipe wall section onto which the respective other transducer 11 is mounted to be received by the respective other transducer 11. Since the signals transmitted with and against the flow travel along the same path, the differences between the upstream and downstream transit times of the ultrasonic signals are directly proportional to the flow velocity of the medium. Thus a product of a cross-sectional area of the flow line 3 and the flow velocity provides a measure of the volumetric flow.

Based on the physics of ultrasonic wave propagation and the properties of the measurement unit 7, the flow velocity is given as a function of the measured travel times along the flow $t_{up}$ and against the flow $t_{dn}$, their time difference $t_{dn}-t_{up}$, the number of traverses n in the pipe 3, the inner diameter $d_i$ of the flow line 3, the thickness $d_r$ of the pipe wall, the velocity $c_r$ of ultrasonic signals inside the pipe walls, the velocity $c_m$ of ultrasonic signals inside the medium flowing through the flow line 3, the position of the transducers 11 with respect to the flow line 3 and with respect to each other, in particular their angle of inclination $\alpha$, and the distance $d_S$ between the two.

During measurement operation, the ultrasonic flow meter 5 generates measured flow indications determined by a predefined functional dependency of the indication on the measured flow dependant quantities, here the measured travel times along the flow $t_{up}$ and against the flow $t_{dn}$, and their time difference $t_{dn}-t_{up}$, on predetermined values of parameters inherent to the ultrasonic flow meter 5, here the angles of inclination $\alpha$, the positions of the transducers 11, the distance $d_s$ between the transducers 11 and an electronic delay $t_e$ involved in signal reception and processing, and on predetermined values of parameters inherent to the measurement site, here the thickness $d_r$ of the pipe wall, the inner diameter $d_i$ of the flow line 3, the velocity $c_r$ of ultrasonic signals inside the pipe wall and the velocity $c_m$ of ultrasonic signals in the medium. For the embodiment shown in FIG. 2, the measured flow indication is determined by the following functional dependency:

$$Q = \frac{n \cdot \pi}{4} \cdot \frac{d_i^3 \cdot (t_{dn} - t_{up})}{(t_{up} - t_v) \cdot (t_{dn} - t_v) \cdot \sin(2\gamma)} \quad (3)$$

Wherein:

n is the number of traverses inside the pipe, $d_i$ is the inner diameter of the pipe, $t_{dn}$ is the measured travel time against the direction of flow, $t_{up}$ is the measured travel time along the flow, $t_v$ is the travel time of the signals inside the pipe walls and the transducers including an electronic signal delay to due to the signal reception and its processing, and $\gamma$ is the angle of injection at which the signals enters the interior of the flow line 3, which is a function of the pipe wall thickness $d_r$, the velocity $c_s$ of ultrasonic signals inside the sensor, the velocity $c_r$ of ultrasonic signals inside the pipe wall, the velocity $c_m$ of ultrasonic signals inside the medium and the angle of injection $\alpha$.

The values of the measured quantities and the parameters involved can only be determined with an uncertainty, and thus contribute to the overall measurement uncertainty of the indicated flow Q depending on their nominal value, the size of their uncertainty and the functional dependency of the indicated flow Q on the respective quantity or parameter.

The contribution of the uncertainties of each of the quantities and parameters to the overall measurement uncertainty of the ultrasonic flow meter 5 can be calculated based on their respective uncertainty and the functional dependency of the indicated flow Q on the respective quantity or parameter.

Despite the large number of parameters and measured quantities involved, it can be shown, that the overall measurement uncertainty of the indicated flow Q is mainly due to the uncertainty of the inner diameter $d_i$ of the flow line 3.

Figure 3:
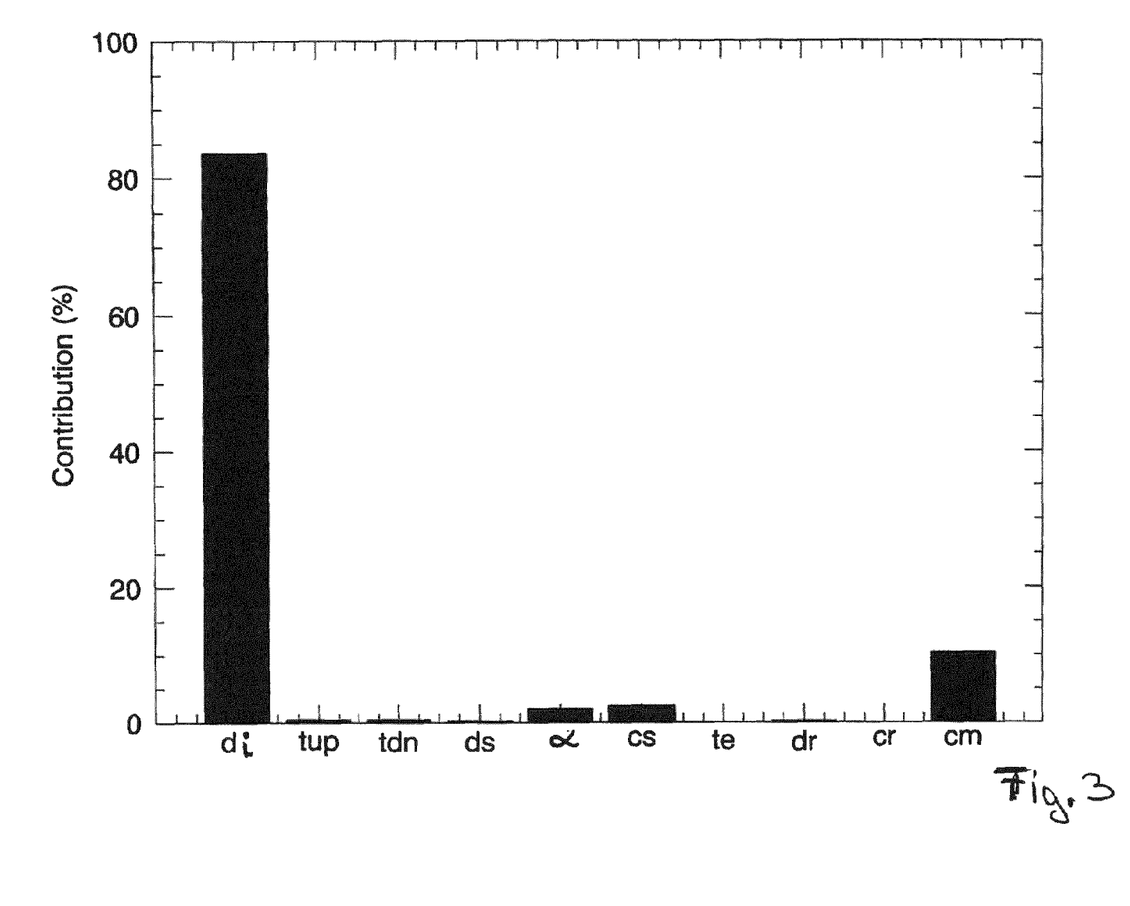
FIG. 3 shows: contributions of uncertainties of measured quantities and parameters inherent to the measurement site to the overall measurement uncertainty of the ultrasonic flow meter shown in FIGS. 1 and 2.

FIG. 3 shows an example of a distribution of the contributions of the uncertainties of the measured quantities and the parameters to the overall measurement uncertainty of the ultrasonic flow meter 5 for a typical example of a set of nominal values of the measured quantities and the parameters. It was determined by a numerical analysis of the contributions of the uncertainties of the measured quantities and parameters to the resulting overall measurement uncertainty of the ultrasonic flow meter 5. The contributions were calculated based on typical values of the measured quantities and the parameters and typical values for the uncertainties of the measured quantities and the parameters listed in the table below and the functional dependency of the measured flow indication Q on their values.

| measured quantity/parameter | nominal value | uncertainty |
|---|---|---|
| measured travel time $t_{dn}$ along the flow | $1.3468\ 10^{-4}$ s | 1e-10 s |
| measured travel time $t_{up}$ against the flow | $1.3456\ 10^{-4}$ s | 1e-10 s |
| distance $d_s$ between the transducers | $1.283\ 10^{-2}$ m | 1% |
| pipe wall thickness $d_r$ | $2.8\ 10^{-3}$ m | 1% |
| velocity $c_r$ of ultrasonic signals in the pipe wall | 3230 m/s | 1% |
| velocity $c_m$ of ultrasonic signals in the medium | 1520 m/s | 6% |
| velocity $c_s$ of ultrasonic signals in the sensor | 2511 m/s | 0.5% |
| angle of injection $\alpha$ | 38° | 0.5% |
| electronic signal delay $t_e$ | $7\ 10^{-7}$ s | 0% |
| inner diameter $d_i$ of the pipe | $8.61\ 10^{-2}$ m | 1% |

Due to modern transducer and signal processing technology, the measured quantities can be determined very accurately. Parameters inherent to the ultrasonic flow meter 5 are also accurately known, since they can either be determined directly with high accuracy or indirectly by calibration and corresponding adjustment of the ultrasonic flow meter 5. In consequence, it is the uncertainty of parameters inherent to the measurement site, rendering the largest limitation with respect to the measurement accuracy achievable with the ultrasonic clamp on flow meter 5.

As can be seen in FIG. 3, the uncertainty of the inner diameter $d_i$ of the flow line 3 accounts for approximately 80% of the overall measurement uncertainty of the indication of the ultrasonic flow meter 5. Compared to that, the velocity $c_m$ of ultrasonic signals in the medium, which has the highest uncertainty, here 6%, only accounts for less than 10% of the overall measurement uncertainty of the indication Q of the ultrasonic flow meter 5. Thus, it is not the parameter with the highest uncertainty, here the velocity $c_m$ of the ultrasonic signals in the medium, but the inner diameter $d_i$, that has the largest impact on the overall measurement uncertainty.

In consequence, the measurement accuracy achievable with the ultrasonic clamp on flow meter 5 could be dramatically improved, if it was possible to reduce or even eliminate the measurement uncertainty due to the uncertainty of the inner diameter $d_i$ of the flow line 3.

The same uncertainty analysis can performed for ultrasonic flow meters operating on the Doppler principle based on the corresponding functional dependency of the flow indication of these flow meters, showing a similarly large contribution of the uncertainty of the inner diameter of the pipe to the overall measurement uncertainty of these devices.

As described above in line verifications of flow meters based on deviations between measured flow indications of the flow meter and an ultrasonic flow meter installed in line to it were limited because of the comparably large measurement uncertainty inherent to the determination of the deviation, which is dominated by the large uncertainty inherent to the measurements of the ultrasonic flow meter.

In order to reduce the contribution of the measurement uncertainty of the ultrasonic flow meter to the measurement uncertainty of the deviation, the invention foresees performance of a preparatory phase prior to any verification to be performed during a later executed verification phase.

During the preparatory phase the flow meter 1 to be verified later on and the ultrasonic clamp on flow meter 5 are calibrated. In a first step, the calibrated flow meter 1 is installed on the flow line 3 at the measurement site, and the calibrated ultrasonic flow meter 5 is installed in line with the flow meter 1 to be verified—as shown in FIG. 1.

Next, both flow meters are put into operation based on known or predetermined values for the required parameters inherent to the measurement site. To this extend the ultrasonic flow meter 5 is supplied with predetermined values of the parameters inherent to the measurement site, including a value for the inner diameter $d_i$ of the flow line 3 at the position of the ultrasonic flow meter 5. The pipe diameter $d_i$ can e.g. be a nominal value specified by the manufacturer of the flow line 3 or a measured value.

There are some ultrasonic clamp on flow meters on the marked, which require to be provided with the outer diameter of the flow line 3 instead of the inner diameter $d_i$. Obviously, since the outer diameter is given by the sum of the inner diameter $d_i$ and the pipe wall thickness $d_r$, the method according to the invention can be applied to these ultrasonic flow meters in the same way. It is only because physically, the uncertainty of ultrasonic clamp on flow meters is dominated by the uncertainty of the inner diameter $d_i$, that the invention is described in detail based on the inner diameter $d_i$. It can however be performed in the same way based on the outer diameter, taking into account the pipe wall thickness $d_r$.

Once the calibrated flow meters are installed and put into operation a medium is sent through the flow line 3 as indicated by the arrow in FIG. 1. Preferably the medium is sent through the flow line 3 in such a way, that it produces a flow through the flow line 3, that can be reproduced. This is preferably a flow, which is typical for the respective measurement application and can thus can be easily reproduced during normal operation of the ongoing process at the measurement site. To this extent, it is sufficient for the occurring flows to exhibit the same or at least a similar flow profile over the interior of the flow line 3. They do not have to have identical nominal flow values.

Once a stable flow profile has established across the interior of the flow line 3, the flow through the flow line 3 is simultaneously measured by the flow meter 1 and the ultrasonic flow meter 5, and a predetermined number n of simultaneously derived measured flow indications $Q^{US}_k$ of the ultrasonic flow meter 5 and $Q^{FL}_k$ of the flow meter 1 for k=1, . . . , n is recorded. To this extend, both flow meters can e.g. be connected to a portable verification tool 15, comprising a memory 17 for storing the corresponding measured flow indications $Q^{US}_k$, $Q^{FL}_k$.

In a next step a virtual pipe diameter D is determined based on the recorded indications $Q^{US}_k$, $Q^{FL}_k$ of both flow meters 1, 5 and the functional dependency of the measured flow indications Q of the ultrasonic flow meter 5. The virtual pipe diameter D is a value for the inner diameter $d_i$, which if it had been applied during the simultaneous measurements would have minimized or even eliminated the differences between the corresponding indications of the flow meter 1 and the ultrasonic flow meter 5.

The virtual pipe diameter D can be determined empirically in an iterative process, by repeatedly measuring flow, recording the predetermined number n of corresponding flow measurement indications, calculating e.g. a mean difference between the corresponding indications, adjusting the value of the inner pipe diameter stored in the ultrasonic flow meter 5 accordingly, and repeating the entire process cycle based on the adjusted value of the inner diameter, until a minimal mean difference between corresponding indications is reached.

Alternatively, it can be determined numerically based on the underlying functional dependency of the indication Q on the measured quantities and the values of the parameters applied by the ultrasonic flow meter 5 during the flow measurements given by the formula given above for the measured flow indication Q of the ultrasonic flow meter 5. Based on the functional dependency of the indications, it is possible to calculate the indications the ultrasonic flow meter 5 would have generated if a different value for the diameter $d_i$ would have been applied during those measurements. Thus the value of the pipe diameter $d_i$ can now be varied numerically in order to find the value at which the mean difference between the corresponding indications of the flow meter 1 and the indications the ultrasonic flow meter 5 would have generated based on the respective value for the pipe diameter $d_i$ are minimal. This algorithm is preferable implemented in corresponding software, which can be run on an intelligent electronic unit 19, e.g. a microprocessor, on the verification tool 15 or on a remote computer or other machine, which is supplied with the necessary data and the functional dependency of the indication.

In a more simple approach, it can be assumed, that the functional dependency of the measurement indication Q of the ultrasonic flow meter 5 can be expressed as a function of a constant term c representing the dependency on the parameters and the measured quantities and the functional dependency on the inner diameter $d_i$., e.g.

$$Q = c d_i^3$$

In this case a preliminary virtual diameter $D_k$ is determined for each pair of the n corresponding measured flow indications $Q^{FL}_k$, $Q^{US}_k$ of the flow meter 1 and the ultrasonic flow meter 5 by determining the respective constant $c_k$ based on the inner diameter $d_i$ applied during these measurements and the measurement indication $Q^{US}_k$ of the ultrasonic flow meter 5:

$$c_k = \frac{Q^{US}_k}{d_i^3}$$

and setting the measurement indication $Q^{FL}_k$ of the flow meter 1 equal to the measurement indication $Q(D_k)$ the ultrasonic flow meter 5 would have indicated according to this approach based on this constant $c_k$.

$$Q^{FL}_k := c_k D_k^3 \Rightarrow D_k = \sqrt[3]{\frac{Q^{FL}_k}{c_k}}$$

The virtual diameter D is then set equal to the average of all n preliminary virtual diameters $D_k$. This causes the average of the measurement indications $Q^{US}(D)$ of the ultrasonic flow meter determined based on the virtual diameter D to become equal to the average of the measurement indications $Q^{FL}$ indicated by the flow meter 1 to be verified. Therefore the average of the differences between the two indications tends to 0.

The virtual pipe diameter D is stored together with all other values of the parameters of the measurement site.

Whilst the flow meter 1 stays in place after completion of the preparatory phase, the ultrasonic flow meter 5 can be taken off the site and be used in other applications. Also the ultrasonic flow meter 5 can be re-calibrated on a calibration rig frequently, so that it is always ensured, that it maintains its initial measurement accuracy.

Whenever verification of the flow meter 1 on the measurement site is desired or required, e.g. by safety regulations, this can be done easily without removal of the flow meter 1 of the measurement site, by executing the verification phase according to the invention described below.

During the verification phase, the preferably newly re-calibrated ultrasonic flow meter 5 is installed on the measurement site in the same way as during the preparatory phase and set up to determine its measured flow indications $Q^{US}_k$ based on the value of the virtual pipe diameter D determined during the preparatory phase.

Like during the preparatory phase a medium is send through the flow line 3 as indicated by the arrow in FIG. 1. Preferably the medium is send through in the same way as during the preparatory phase, subjecting both flow meters 1, 5 to the same measurement conditions as during the preparatory phase.

Once a stable flow profile has established across the interior of the flow line 3, this flow is simultaneously measured with the flow meter 1 to be verified and the ultrasonic flow meter 3, and a predetermined number m of corresponding measured flow indications $Q^{US}_k$, $Q^{FL}_k$ from both devices is recorded. To this extent, both flow meters can once again be connected to the portable verification tool 15, comprising the memory 17 for storing the corresponding measured flow indications.

Based on the stored indications $Q^{US}_k$, $Q^{FL}_k$, a deviation between the simultaneously derived indications of the flow meter 1 and the ultrasonic flow meter 5 is determined and compared to a predetermined deviation limit.

If the deviation determined during the verification phase is within the deviation limit, the flow meter 1 is verified. If the deviation exceeds the deviation limit, an alert is issued requiring additional actions to be taken.

The deviation can be defined as a simple deviation $\Delta$ determined as a difference $\Delta_k = Q^{US}_k - Q^{FL}_k$ between any measured flow indication $Q^{US}_k$ of the ultrasonic flow meter 5 and the simultaneously derived measured flow indication $Q^{FL}_k$ of the flow meter 1 to be verified.

Preferably, verification is not performed based on the simple deviation $\Delta$ given by the differences $\Delta_k$, but based on an average deviation $\overline{\Delta}$ given by an average of these differences $$\overline{\Delta} = \frac{1}{m}\sum_{k=1}^{m}\Delta_k$$

which is then compared to a deviation limit for the average deviation $\overline{\Delta}$.

In correspondence with relation (2) given above, the standard measurement uncertainty $u_{\overline{\Delta}}$ of the average deviation $\overline{\Delta}$ comprises a term accounting for the uncertainty $u_{FL}$ of the flow meter 1 and a term accounting for the uncertainty of the ultrasonic flow meter 5 during the preparatory phase. Due to the use of the virtual diameter D, the uncertainty of the ultrasonic flow meter 5 is reduced down to a term accounting for a repeatability $s_{repeat}$ of the measurement indications $Q^{US}_k$ of the ultrasonic flow meter 5. The reason for this is, that all systematic measurement errors of the ultrasonic flow meter 5 are compensated by the use of the virtual diameter D determined during the preparatory phase.

The repeatability $s_{repeat}$ can for example be determined based on the m measurement indications $Q^{US}_k$ obtained during the verification phase by the following relation:

$$s^2_{repeat} = \frac{1}{m-1}\sum_{k=1}^{m}\left(Q^{US}_k - \overline{Q^{US}}\right)^2$$

with $$\overline{Q^{US}} = \frac{1}{m}\sum_{k=1}^{m}Q^{US}_k$$

Thus the uncertainty $u_{\overline{\Delta}}$ of the average deviation $\overline{\Delta}$ given by the average of the differences $\Delta_k$ becomes:

$$u_{\overline{\Delta}} = \sqrt{u^2_{FL} + \frac{s^2_{repeat}}{m}} \quad (4)$$

In this formula, the term accounting for the measurement uncertainty $u_{FL}$ of the flow meter 1 is not reduced by a factor of m, because the virtual diameter D was determined based on measurement indications $Q^{FL}$ of this flow meter 1 exhibiting this uncertainty $u_{FL}$. As a consequence this uncertainty $u_{FL}$ induces an uncorrected systematic error, which is not reduced by the number m of measurements performed.

The uncertainty $u_\Delta$ of the simple deviation $\Delta$ is obtained by setting m equal to 1 in formula (4).

Considering again the numerical example given above for the verification method used in the prior art of a flow meter 1 to be verified having a measurement accuracy of 0.5% and an uncertainty $u_{FL}$ of half its measurement accuracy, and applying a typical repeatability $s_{repeat}$ of ultrasonic clamp-on flow meters of 0.3% and a number of m=10 flow measurements during the verification phase, equation (4) renders a standard uncertainty $u_{\overline{\Delta}}$ of the average deviation of:

$$u_{\overline{\Delta}} = \sqrt{\left(\frac{0.5}{2}\right)^2 + \frac{0,3^2}{10}}$$

$$\approx 0,27\%$$

If in this example only a single measurement is performed during the verification phase (m=1) the standard uncertainty $u_\Delta$ of the simple deviation $\Delta$ would still only amount to 0.39%.

In both cases—m=10 and even for m=1—the standard uncertainty $u_{\overline{\Delta}}$, $u_\Delta$ is very much lower, than the standard uncertainty of 1.03% obtained for the method according to the prior art described in the introduction.

The deviation limit is preferably set based on the standard uncertainty of the deviation applied. It can for example be set equal to twice the standard uncertainty $u_\Delta$, $u_{\overline{\Delta}}$.

The deviation limit is preferably determined based on the specific requirements of the measurement site. Setting a higher deviation limit, thus allowing larger deviations reduces the probability of false alerts. At the same time, it limits the range of verifiably measurement accuracies. On the other hand, a low deviation limit increases the range of verifiable measurement accuracies, but increases the probability of false alerts.

Obviously an alert can be caused by an impaired pipe integrity within the flow line 3, by an impaired measurement property of the ultrasonic flow meter 5 or by an impaired measurement property of the flow meter 1 to be verified. Since in most cases pipe integrity of the flow line 3 can be easily checked, this is preferably the first action taken. Proper operation of the ultrasonic flow meter 5 can be ascertained by re-calibrating the ultrasonic flow meter 5, which is preferably done prior to the verification phase. Thus once pipe integrity and proper operation of the ultrasonic flow meter 5 are ascertained, an alert will lead to a re-calibration recommendation for the flow meter 1 to be verified.

The determination of the deviation, its comparison to the deviation limit and the indication of the corresponding alert or verification can also be performed by the portable verification tool 15.

The verification phase can be executed regularly, periodically or on demand. Depending on the requirements of the specific application the method according to the invention can be applied in order to decrease re-calibration costs or in order to enhance confidence in the measurement indications obtained by the verified flow meter 1 in between regularly scheduled re-calibrations.

To decrease calibration costs, one or more verification phases are executed between consecutively executed re-calibrations of the flow meter 1, allowing for the time intervals between consecutive re-calibrations to be extended. To this extent consecutive verification phases can for example be performed periodically, for as long as the deviations determined therein, do not exceed the deviation limit. During this time the in line verification according to the invention ensures, that the flow meter 1 complies to a method specific measurement accuracy, corresponding to the deviation limit set by the applicant. In that case re-calibration is only performed, when the deviation exceeded the deviation limit.

To enhance confidence in the measurement indications $Q^{FL}$ of the flow meter 1, verification phases can be executed in between regularly scheduled re-calibrations as an additional safety measure, allowing the user to notice deviations from the method-specific accuracy during the time interval between consecutive re-calibrations.

The method specific verifiably measurement accuracy can be further improved by applying two identical ultrasonic clamp-on flow meters 5a, 5b during the preparatory and during the verification phase. Both ultrasonic flow meters 5a, 5b are preferably mounted close to each other on the flow line 3. They are preferably installed at an angle of 90° towards each other, such that a propagation plane in which the ultrasonic signals of the first ultrasonic flow meter 5a are transmitted through the flow line 3 is perpendicular to a propagation plane in which the ultrasonic signals of the second ultrasonic flow meter 5b are transmitted through the flow line 3.

Again a preparatory phase is performed, wherein a flow through the flow line 3 is simultaneously measured by the flow meter 1, the first ultrasonic flow meter 5a and the second ultrasonic flow meter 5b, and a predetermined number n of simultaneously derived measured flow indications $Q^{US1}_k$, $Q^{US2}_k$, $Q^{FL}_k$ of the two ultrasonic flow meters 5a and 5b and the flow meter 1 for k=1, . . . , n is recorded. During the preparatory phase both ultrasonic flow meters 5a, 5b are operated based on the same set of parameters including the same value for the inner diameter $d_i$ of the flow line 3.

Like in the previous embodiment, a virtual diameter $D_k$ is calculated for each set of measured flow indications $Q^{US1}_k$, $Q^{US2}_k$, $Q^{FL}_k$. This time however, the average of the measured flow indications $Q^{US1}_k$, $Q^{US2}_k$ of the ultrasonic flow meters 5a, 5a is used instead of the measured flow indication $Q^{US}_K$ of the single ultrasonic flow meter 5. This can for example be done by simply replacing the measured flow indication $Q^{US}_K$ of the single ultrasonic flow meter 5 in the equation for determining the constant $c_k$ given above by the average of the measured flow indications $Q^{US1}_k$, $Q^{UD2}_k$ and proceeding from there as described above.

Again, the virtual diameter D is then set equal to the average of all n preliminary virtual diameters $D_k$, reducing the average of the differences between the average of the measured flow indications $Q^{US1}_k$, $Q^{US2}_k$ and the measured flow indication $Q^{FL}_k$ of the flow meter 1 to 0.

During each verification phase, the preferably newly re-calibrated ultrasonic flow meters 5a, 5b are re-installed on the measurement site in the same way as during the preparatory phase and are both set up to determine their measured flow indications $Q^{US1}_k$, $Q^{US2}_k$ based on the value of the virtual pipe diameter D determined during the preparatory phase.

During the verification phase the flow is simultaneously measured by the flow meter 1 to be verified and by the two ultrasonic flow meters 5a, 5b, and a predetermined number m of simultaneously derived measured flow indications $Q^{FL}_K$, $Q^{US1}_k$, $Q^{US2}_k$ of the flow meter 1 to be verified and the two ultrasonic flow meters 5a, 5b are recorded.

Like in the previous embodiment a deviation is determined based on the on the stored indications $Q^{US1}_k$, $Q^{US2}_k$, $Q^{FL}_k$ and compared to a predetermined deviation limit.

In this embodiment, the simple deviation $\Delta$ is given by the differences $\Delta_k$ between the measured flow indications $Q^{FL}_k$ of the flow meter 1 and the average of the measured flow indications $Q^{US1}_k$, $Q^{US2}_k$ of the two ultrasonic flow meters 5a, 5b:

$$\Delta = Q^{FL} - \frac{Q^{US1} + Q^{US2}}{2}$$

Again, verification is preferably performed based on the average deviation $\overline{\Delta}$ determined as an average of these differences $\Delta_k$. The average deviation $\overline{\Delta}$ is then compared to a predetermined deviation limit defined in the same way as described above, based on the uncertainty $u_{\overline{\Delta}}$ of the average deviation $\overline{\Delta}$, which in this embodiment is given by:

$$u_{\overline{\Delta}} = \sqrt{u_{FL}^2 + \frac{s_{repeat}^2}{m}}$$

wherein the extra factor of two is due to the use of the average $\overline{Q_k^{US}}$ of the measured flow indications $Q^{US1}_k$, $Q^{US2}_k$ of the two ultrasonic flow meters 5a, 5b.

Like in the previous example, an alert is issued in case the average deviation $\overline{\Delta}$ determined during the verification phase exceeds the set deviation limit, leading to the additional actions described above. Obviously when two ultrasonic flow meters 5a, 5b are applied, proper operation of both of them needs to be ascertained. This can be done by re-calibrating both of them prior to the verification phase. Instead or in addition to this, a cross check between the two can be easily performed based on their measurement indications $Q^{US1}_k$, $Q^{US2}_k$ during the preparatory phase as well as during the verification phase.

The method according to the invention not only drastically reduces the measurement uncertainty involved in in-line verifications using ultrasonic flow meters, but can also be performed fulfilling requirements regarding traceability, since traceable ultrasonic flow meters 5, 5a, 5b can be used, the method itself follows an exactly defined procedure, and the measurement uncertainty of the method, in particular of the determination of the deviation, is known.

The invention claimed is:

1. A method of in line verification of a flow meter, comprising:
    method steps performed during a preparatory phase and method steps performed during at least one verification phase, wherein the ethod steps performed during preparatory phase comprises the steps of:
    calibrating the flow meter and installing it in a flow line at a measurement site,
    installing a calibrated ultrasonic clamp on flow meter in line to the flow meter on the same flow line;
    setting up the ultrasonic flow meter to generate measured flow indications based on a predetermined functional dependency of the indication on flow dependant quantities measured by the ultrasonic flow meter and predetermined values of parameters inherent to the measurement site, including a predetermined value of an inner diameter of the flow line;
    simultaneously measuring a flow through the flow line with the ultrasonic flow meter and with the flow meter and recording a predetermined number of their simultaneously derived measured flow indications; and
    based on the recorded measured flow indications and the functional dependency of the measured flow indications of the ultrasonic flow meter determining a virtual pipe diameter such, that it is equal to a value of the inner diameter, when applied during the simultaneous measurements would have minimized the differences between corresponding measured flow indications of the flow meter and the ultrasonic flow meter, and
    wherein the method steps performed during each verification phase comprises the steps of:
    installing the ultrasonic flow meter in the same way as during the preparatory phase and setting it up to determine its measured flow indications based on the virtual pipe diameter;
    simultaneously measuring a flow through the flow line with the flow meter and the ultrasonic flow meter;
    determining a deviation between simultaneously derived measured flow indications of the flow meter and the ultrasonic flow meter; and issuing an alert in case the deviation exceeds a predetermined deviation limit, which was set based on a standard measurement uncertainty inherent to the determination of the deviation.

2. The method according to claim 1, wherein:
the flow of the medium sent through the flow line is a reproducible flow providing the same flow profile across an interior of the flow line during the preparatory phase and the verification phase.

3. The method according to claim 1, wherein:
the verification phase is executed regularly, periodically or on demand.

4. The method according to claim 1, wherein:
one or more verification phases are executed between consecutively executed re-calibrations of the flow meter; and
time intervals between consecutive re-calibrations are determined based on the deviations determined during the verification phases.

5. The method according to claim 1, wherein:
the deviation is a simple deviation given by a difference between a measured flow indication of the ultrasonic flow meter and a simultaneously derived measured flow indication of the flow meter to be verified.

6. The method according to claim 1, wherein:
the deviation is an average deviation given by an average of the differences between the simultaneously derived measured flow indications of the ultrasonic flow meter and the measured flow indications of the flow meter to be verified derived during a predetermined number of flow measurements performed during the verification phase.

7. The method according to claim 1, wherein:
the standard measurement uncertainty inherent to the determination of the deviation solely comprises a contribution of an uncertainty of the flow meter and a contribution of a repeatability of the measured flow indications of the ultrasonic flow meter.

8. A method of in line verification of a flow meter comprising:
method steps performed during a preparatory phase and method steps performed during at least one verification phase, wherein:
the method steps performed during the preparatory phase comprises the steps of:
calibrating the flow meter and installing it in a flow line at a measurement site;
installing two calibrated ultrasonic clamp on flow meters in line to the flow meter on the same flow line;
setting up the ultrasonic flow meters to generate measured flow indications based on a predetermined functional dependency of the measured flow indication on flow dependant quantities measured by the ultrasonic flow meters and predetermined values of parameters inherent to the measurement site, including a predetermined value of an inner diameter of the flow line;
simultaneously measuring a flow through the flow line with the ultrasonic flow meters and with the flow meter and recording a predetermined number of their simultaneously derived measured flow indications; and
determining a virtual pipe diameter based on the recorded measured flow indications and the functional dependency of the measured flow indications of the ultrasonic flow meters, when applied during the simultaneous measurements would have minimized the differences between the averages of the simultaneously derived, measured flow indications of the ultrasonic flow meters and the simultaneously derived measured flow indications of the flow meter, and
wherein the method steps performed during each verification phase comprises the steps of:
installing the ultrasonic flow meters in the same way as during the preparatory phase and setting each of them up to determine its measured flow indications based on the virtual pipe diameter,
simultaneously measuring a flow through the flow line with the flow meter and the ultrasonic flow meters,
determining a deviation between measured flow indications of the flow meter and the average of the simultaneously derived measured flow indications of the ultrasonic flow meters; and
issuing an alert in case the deviation exceeds a predetermined deviation limit, which was set based on a standard measurement uncertainty inherent to the determination of the deviation.

9. The method according to claim 8, wherein:
the deviation is a simple deviation given by a difference between the average of the simultaneously derived measured flow indications of the ultrasonic flow meters and a simultaneously derived measured flow indication of the flow meter to be verified.

10. The method according to claim 8, wherein:
the deviation is an average deviation given by an average of differences between the averages of the simultaneously derived measured flow indications of the ultrasonic flow meters and a simultaneously derived measured flow indication of the flow meter to be verified, derived during of a predetermined number of flow measurements performed during the verification phase.

11. The method according to claim 8, wherein:
the measurement uncertainty inherent to the determination of the deviation solely comprises a contribution of an uncertainty of the flow meter and a contribution of a repeatability of the averages the measured flow indications of the ultrasonic flow meters.

* * * * *